Feb. 12, 1929. Re. 17,216

R. E. GREEN

PRESSING MACHINE ATTACHMENT

Original Filed July 15, 1926

Inventor:

Robert E. Green,

Witness:

Jas. E. Hutchinson.

By Milans & Milans Attorneys.

Reissued Feb. 12, 1929. Re. 17,216

UNITED STATES PATENT OFFICE.

ROBERT E. GREEN, OF MOBILE, ALABAMA.

PRESSING-MACHINE ATTACHMENT.

Original No. 1,610,047, dated December 7, 1926, Serial No. 122,599, filed July 15, 1926. Application for reissue filed March 10, 1927. Serial No. 174,343.

My invention relates to pressing machines, particularly to pressing machines of the type known to the trade as valve in head machines, wherein a heating medium such as steam is admitted internally of an upper pressing element or head, having a perforated face plate covered by a cloth and which is arranged for rocking movement downwardly against a lower pressing element for pressing material therebetween.

The primary object of the invention is the provision of an attachment for such machines, wherein by use of the attachment a valve in head machine may be converted into one of the type known as hot head machines, wherein the upper pressing head is provided with a solid face plate heated by steam from within the head.

A further object is the provision of a presser plate member adapted for detachable engagement over the movable presser element of a pressing machine.

A still further object is the provision of a presser plate attachment for the movable presser element of pressing machines, which, in addition to accomplishing the above objects, may be employed as a replacement unit for the movable presser head of machines of the hot head type.

With these and such other objects in view as will be apparent from the description, my invention resides in the novel construction, combination and arrangement of parts hereinafter described and claimed, and illustrated in the accompanying drawings, wherein is shown one practical embodiment of the principles of the invention.

Figure 1:
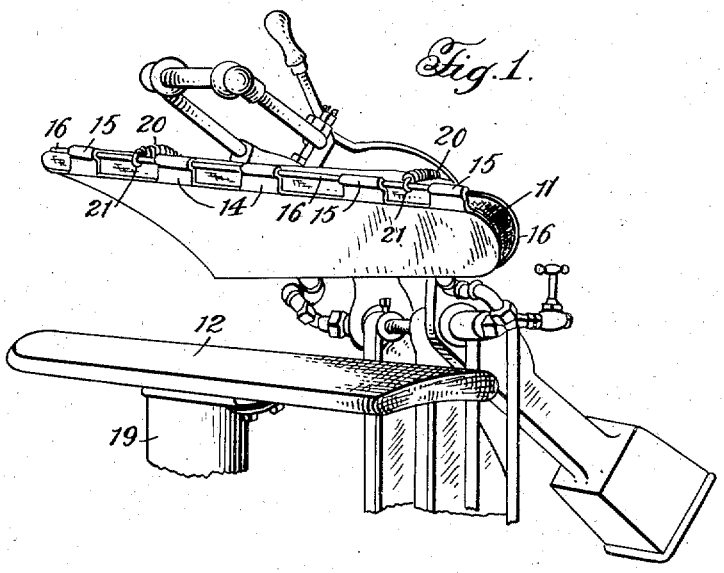
Fig. 1 is an elevation of the head portion of a conventional pressing machine with the attachment in service position.
Figure 2:
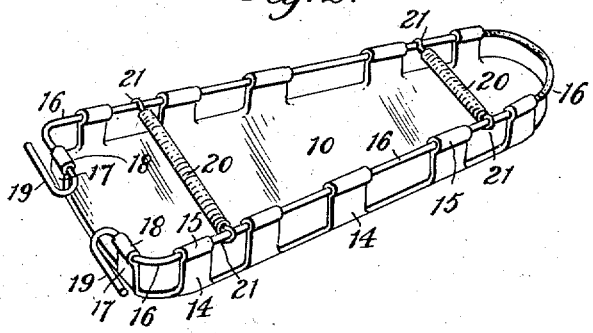
Fig. 2 is a bottom perspective of a presser plate attachment constructed in accordance with the principles of the invention.

The attachment comprises a flat metal plate 10, preferably of aluminum, formed of the same configuration as the face of an upper, movable presser head 11 of a pressing machine of conventional construction having a lower, stationary, horizontal presser head 12 arranged on the pedestal support 13.

The opposite side edges of the plate 10 are formed with upstruck, integral flanges 14 arranged longitudinally thereon at spaced intervals, with the upper edges of the flanges being rolled inwardly as at 15 to form bearings for a substantially U-shaped brace rod 16 disposed therethrough and extending along each side edge of the presser plate and around the narrowed end thereof.

The larger end edge of the plate 10 is formed with a pair of flanges 17 similar to the side edge flanges 14, and the free ends of the rod 16 are passed through the rolled bearings 18 and bent outwardly back upon themselves to form handle portions 19 at the larger end of the plate.

The side edge flanges 14 may be slightly inwardly inclined to provide for a spring tension which insures a frictional engagement of the flanges against the side edges of the presser head 11 when the plate is attached thereto, as shown in Fig. 1. A plurality of flexible, resilient elements such as retracting spring coils 20, provided at each end with hooks 21, are disposed over the top of the presser head 11 with the hooks engaging the rod 16 at opposite sides of the plate attachment, thereby insuring a positive means for retaining the plate 10 in service position when attached.

In applying, the handles 19 are grasped and the plate 10 is drawn over the movable presser head of a pressing machine, with the bend of the brace rod 16 abutting the reduced end of the head. The handles are then moved against the large end of the head to engage the flanges 14 over the sides of the head. By moving the handles in a direction to separate them the opposed gripping portions or flanges 14 will be forced apart to allow the attachment to be readily applied or removed. The top fastening elements 20 are then applied and the attachment is ready for service. It will be obvious that heat applied to the presser head 11 renders the plate 10 an efficient hot presser plate, converting a valve in head machine to a hot head machine.

The device may also be employed as a replacement unit for machines of the hot head type, simply by applying it over the metal presser head of such machines, in the same manner as described in its application to the valve in head machines.

While in this preferred embodiment of the invention I have illustrated and described certain details and materials entering into the construction and operation thereof, I desire it to be understood that the invention is not to be limited thereto, but that any desired changes and modifications may be made in the structural details as will fall within the scope of the invention as claimed.

I claim:—

1. A presser head attachment for movable head pressing machines, comprising a flat metal plate shaped to the configuration of a presser head, a series of spaced, upright flanges formed integral with the side edges of said plate, said flanges being tensioned by inward inclination for gripping engagement over the sides of a presser head, bearings formed on the upper ends of said flanges, and a handle member received through said bearings for application of said plate to a presser head.

2. A presser head attachment for movable head pressing machines comprising a plate, a series of spaced inwardly directed flanges formed on the plate and adapted to engage the sides of the presser head, and resilient members connected to the flanges and engageable over the top of the head for connecting the plate to the head.

3. A presser head attachment for movable head pressing machines comprising a plate, a series of inwardly directed flanges formed on the plate and adapted to engage the sides of the presser head, and means connected to the flanges and engageable over the top of the head for connecting the plate to the head.

4. A presser head attachment for movable head pressing machines comprising a plate having upwardly extending resilient portions adapted to engage the head, and a resilient member cooperating with said upwardly extending portions and extending over the top of the head.

5. The combination of a pressing machine including cooperating heads one movable relative to the other, one of said heads being formed to normally permit the escape of steam through its face, and an attachment installed to prevent said escape of steam, said attachment being in the form of a plate adapted to be introduced between the heads and substantially co-extensive with the effective pressing area therebetween, and securing means formed and adapted to pass transversely over the edges of the head when the plate is moved in a facewise direction against said head.

6. A presser head attachment for movable head pressing machines comprising a plate having upwardly extending securing members including spring held gripping portions, and handle means connected to the members and extending outwardly from one end of said plate adapted to be grasped to force said members apart in applying or removing the plate to or from the head.

In testimony whereof I hereunto affix my signature.

ROBERT E. GREEN.